United States Patent
Leroux

(10) Patent No.: US 12,167,347 B2
(45) Date of Patent: Dec. 10, 2024

(54) LINK-ADAPTATION POWER BACKOFF

(71) Applicant: Telefonaktiebolaget LM Ericsson (publ), Stockholm (SE)

(72) Inventor: Philippe Leroux, Ottawa (CA)

(73) Assignee: Telefonaktiebolagget LM Ericsson (Publ), Stockholm (SE)

(*) Notice: Subject to any disclaimer, the term of this patent is extended or adjusted under 35 U.S.C. 154(b) by 381 days.

(21) Appl. No.: 17/627,424

(22) PCT Filed: Jul. 25, 2019

(86) PCT No.: PCT/IB2019/056365
§ 371 (c)(1),
(2) Date: Jan. 14, 2022

(87) PCT Pub. No.: WO2021/014197
PCT Pub. Date: Jan. 28, 2021

(65) Prior Publication Data
US 2022/0264482 A1  Aug. 18, 2022

(51) Int. Cl.
*H04W 52/36* (2009.01)
*H04B 7/0452* (2017.01)
(Continued)

(52) U.S. Cl.
CPC ........ *H04W 52/367* (2013.01); *H04B 7/0452* (2013.01); *H04B 7/0617* (2013.01);
(Continued)

(58) Field of Classification Search
CPC ............... H04W 52/367; H04W 52/12; H04W 52/143; H04W 52/146; H04W 52/346;
(Continued)

(56) References Cited

U.S. PATENT DOCUMENTS 7,120,199 B2    10/2006  Thielecke et al.
11,044,675 B2 *  6/2021  Pelletier .............. H04W 52/367
(Continued)

FOREIGN PATENT DOCUMENTS

EP    1017187 A2 *  7/2000  ............ H04W 52/10
EP    1255369 A1     6/2002
WO  WO-2011009359 A1 *  1/2011  .......... H04W 52/245

OTHER PUBLICATIONS

Machine translated version of WO 2011009359 A1 (Year: 2011).*
Invitation to Pay Additional Fees and, Where Applicable, Protest Fee dated Mar. 30, 2020 issued in PCT Application No. PCT/IB2019/056365, consisting of 14 pages.
(Continued)

*Primary Examiner* — Charles C Jiang
*Assistant Examiner* — Rachel Elizabeth Marks
(74) *Attorney, Agent, or Firm* — Weisberg I.P. Law, P.A.

(57) ABSTRACT

Apparatuses and methods are disclosed for link-adaptation (LA) power backoff for beamforming. In one embodiment, a method in a network node includes triggering a link adaptation for a channel transmission, the link adaptation comprising adjusting a transmit power of the channel transmission based at least in part on whether a previous channel transmission was correctly decoded. In another embodiment, a method in a wireless device includes receiving a downlink, DL, channel transmission at a first transmit power value; and transmitting a message to a network node, the message indicating a power saturation condition as a result of the first transmit power value.

20 Claims, 10 Drawing Sheets

(51) Int. Cl.
*H04B 7/06* (2006.01)
*H04L 1/00* (2006.01)
*H04L 1/1812* (2023.01)
*H04L 5/00* (2006.01)
*H04W 52/12* (2009.01)

(52) U.S. Cl.
CPC .......... *H04L 1/0003* (2013.01); *H04L 1/1812* (2013.01); *H04L 5/0053* (2013.01); *H04W 52/12* (2013.01)

(58) Field of Classification Search
CPC ............... H04W 52/262; H04W 52/48; H04W 52/20; H04B 7/0452; H04B 7/0617; H04L 1/0003; H04L 1/1812; H04L 5/0053; H04L 1/18; H04L 1/0009
See application file for complete search history.

(56) References Cited

U.S. PATENT DOCUMENTS

| | | | |
|---|---|---|---|
| 2014/0204857 A1* | 7/2014 | Mallik | H04L 25/0328 370/329 |
| 2016/0316490 A1* | 10/2016 | Wang | H04W 4/70 |
| 2016/0345270 A1* | 11/2016 | HomChaudhuri | H04L 5/0055 |
| 2016/0373903 A1* | 12/2016 | Zeira | H04W 72/0453 |
| 2017/0201301 A1 | 7/2017 | Kotecha et al. | |
| 2019/0166563 A1 | 5/2019 | Ansari et al. | |
| 2020/0205085 A1* | 6/2020 | Li | H04W 52/242 |

OTHER PUBLICATIONS

International Search Report and Written Opinion dated Jun. 9, 2020 issued in PCT Application No. PCT/IB2019/056365, consisting of 19 pages.

* cited by examiner

LINK-ADAPTATION POWER BACKOFF

CROSS-REFERENCE TO RELATED APPLICATION

This application is a Submission Under 35 U.S.C. § 371 for U.S. National Stage Patent Application of International Application No: PCT/IB2019/056365, filed Jul. 25, 2019 entitled "LINK-ADAPTATION POWER BACKOFF," the entirety of which is incorporated herein by reference.

TECHNICAL FIELD

Wireless communications and in particular, link-adaptation (LA) power backoff.

BACKGROUND

Telecommunication systems generally have a maximum useful receive power and a maximum useful signal-to-interference-plus-noise ratio (SINR) at their receiver. Reaching higher SINR, by, e.g., increasing the transmit power, may not necessarily provide higher performance. Furthermore, reaching higher received power can degrade performance as the radio frequency (RF) receiver chains may not cope with the potential saturation. Automatic gain control (AGC) may forcibly reduce the received power in order to avoid such saturation which in turns may degrade properly receiving portions of the signal. Traditionally, telecommunication transmitters are calibrated to avoid such situation. However, with more complex transmitters such as Advanced antenna systems (AAS) where beamforming is used, the received power or received SINR may be difficult to predict in order to calibrate the system to avoid such saturation situations.

Advanced antenna systems (AAS) are used to beamform signals to wireless devices (WDs) (e.g., user equipments (UEs)). One purpose for beamforming is to increase the signal-to-interference-plus-noise ratio (SINR) to the WD by increasing gain and decreasing interference. Previously, without beamforming, the transmit power would generally be constant and interference would therefore be predictable from other cells. With beamforming, however, power is transmitted with more like a flashlight effect, where one transmission time interval (TTI) has sudden power in one direction leading to interference that will no longer be there in the next TTI. Improving SINR while avoiding using excess power becomes more challenging (e.g., as compared to traditional communications).

SUMMARY

Some embodiments advantageously provide a method and apparatus for link-adaptation (LA) power backoff.

According to a first aspect of the present disclosure, a method in a network node is provided. The method includes triggering a link adaptation for a channel transmission, the link adaptation comprising adjusting a transmit power of the channel transmission based at least in part on whether a previous channel transmission was correctly decoded.

In some embodiments of the first aspect, the link adaptation further includes an outer-loop link adaption comprising the adjusting the transmit power of the channel transmission based at least in part whether the previous channel transmission was correctly decoded; and an inner-loop link adaptation comprising adjusting a modulating and coding scheme, MCS, of the channel transmission based at least in part on whether the previous channel transmission was correctly decoded. In some embodiments of the first aspect, the channel transmission and the previous channel transmission each correspond to a beamformed signal. In some embodiments of the first aspect, the method further includes transmitting a first downlink, DL, channel transmission at a first transmit power value; and receiving a Hybrid Automatic Repeat reQuest, HARQ, indication of reception of the first DL channel transmission; and the triggering the link adaptation for the channel transmission further includes performing the link adaptation comprising adjusting a transmit power of a second DL channel transmission based at least in part on the received HARQ indication.

In some embodiments of the first aspect, the triggering the link adaptation further includes, based at least in part on the received HARQ indication, selecting one of an outer-loop link adaption comprising the adjusting the transmit power of the second DL channel transmission based at least in part on the received HARQ indication; and an inner-loop link adaptation comprising increasing a modulating and coding scheme, MCS, of the second DL channel transmission based at least in part on the received HARQ indication. In some embodiments of the first aspect, the performing the link adaptation further includes: if the HARQ indication indicates an acknowledgement and a modulating and coding scheme, MCS, of the first DL channel transmission corresponds to a maximum MCS, performing the link adaptation by adjusting the transmit power of the second DL channel transmission; and if the HARQ indication indicates an acknowledgement and a modulating and coding scheme, MCS, of the first DL channel transmission corresponds to less than the maximum MCS, performing the link adaptation by at least one of increasing the MCS of the second DL channel transmission and maintaining the transmit power of the second DL channel transmission at the first transmit power value.

In some embodiments of the first aspect, the performing the link adaptation further includes: if the HARQ indication indicates a non-acknowledgement and the first transmit power value is less than a predetermined maximum power value, performing the link adaptation by increasing the transmit power of the second DL channel transmission to greater than the first transmit power value; and if the HARQ indication indicates a non-acknowledgement and the first transmit power corresponds to the predetermined maximum power value, performing the link adaptation by at least one of decreasing a modulating and coding scheme, MCS, of the second DL channel transmission and maintaining the transmit power of the second DL channel transmission at the first transmit power value.

In some embodiments of the first aspect, the method further includes receiving a first uplink, UL, channel transmission at a first transmit power value; decoding and determining a decoding error rate for decoding the first UL channel transmission; and determining whether a modulation and coding scheme, MCS, of the first UL channel transmission corresponds to a maximum MCS; and the triggering the link adaptation for the channel transmission further includes signaling an indication to a wireless device to perform the link adaptation comprising adjusting the transmit power, the indication based at least in part on the determined decoding error rate and whether the MCS corresponds to the maximum MCS. In some embodiments of the first aspect, the triggering the link adaptation further includes if the MCS of the first UL channel transmission corresponds to the maximum MCS and the decoding error rate at most meets a threshold error rate, signaling the indication to perform the link adaptation by reducing the transmit power of a second UL channel transmission.

In some embodiments of the first aspect, the triggering the link adaptation for the channel transmission includes receiving an interference indication from a neighboring network node; and as a result of the received interference indication, triggering the link adaptation for the channel transmission to reduce the transmit power of the channel transmission. In some embodiments of the first aspect, the method further includes implementing power sharing between at least two link adaptation processes for at least two multiple-user multiple-input multiple-output, MU MIMO, wireless devices, based at least in part on a Hybrid Automatic Repeat reQuest, HARQ, indication received from at least one of the two MU MIMO wireless devices. In some embodiments of the first aspect, the method further includes based at least in part on a channel quality indicator, CQI, report, a reference signal receiving power, RSRP, measurement, and an angle of arrival, AOA, estimation, determining an initial power level for a downlink, DL, channel transmission to prevent power saturation at a wireless device.

According to a second aspect of the present disclosure, a method in a wireless device is provided. The method includes receiving a downlink, DL, channel transmission at a first transmit power value. The method includes transmitting a message to a network node, the message indicating a power saturation condition as a result of the first transmit power value.

In some embodiments of the second aspect, the method further includes, as a result of transmitting the message indicating the power saturation condition, receiving a second DL channel transmission having a second transmit power value, the second transmit power value being less than the first transmit power value. In some embodiments of the second aspect, the second DL channel transmission corresponds to a beamformed signal. In some embodiments of the second aspect, the method includes determining whether the received DL channel transmission at the first transmit power value exceeds a predetermined transmit power threshold value. In some embodiments of the second aspect, the method further includes if the first transmit power value exceeds the predetermined transmit power threshold value, determining to transmit the message; and if the first transmit power value does not exceed the predetermined transmit power threshold value, determining to not transmit the message.

According to a third aspect of the present disclosure, a network node is provided. The network node includes processing circuitry. The processing circuitry configured to cause the network node to trigger a link adaptation for a channel transmission, the link adaptation comprising adjusting a transmit power of the channel transmission based at least in part on whether a previous channel transmission was correctly decoded.

In some embodiments of the third aspect, the link adaptation further includes an outer-loop link adaption comprising the adjusting the transmit power of the channel transmission based at least in part whether the previous channel transmission was correctly decoded. In some embodiments of the third aspect, the link adaptation further includes an inner-loop link adaptation comprising adjusting a modulating and coding scheme, MCS, of the channel transmission based at least in part on whether the previous channel transmission was correctly decoded. In some embodiments of the third aspect, the channel transmission and the previous channel transmission each correspond to a beamformed signal. In some embodiments of the third aspect, the processing circuitry is further configured to transmit a first downlink, DL, channel transmission at a first transmit power value; receive a Hybrid Automatic Repeat reQuest, HARQ, indication of reception of the first DL channel transmission; and trigger the link adaptation for the channel transmission by being configured to: perform the link adaptation comprising adjusting a transmit power of a second DL channel transmission based at least in part on the received HARQ indication.

In some embodiments of the third aspect, processing circuitry is further configured to trigger the link adaptation by being configured to, based at least in part on the received HARQ indication, select one of: an outer-loop link adaption comprising the adjusting the transmit power of the second DL channel transmission based at least in part on the received HARQ indication; and an inner-loop link adaptation comprising increasing a modulating and coding scheme, MCS, of the second DL channel transmission based at least in part on the received HARQ indication. In some embodiments of the third aspect, the processing circuitry is further configured to perform the link adaptation by being configured to: if the HARQ indication indicates an acknowledgement and a modulating and coding scheme, MCS, of the first DL channel transmission corresponds to a maximum MCS, perform the link adaptation by adjusting the transmit power of the second DL channel transmission; and if the HARQ indication indicates an acknowledgement and a modulating and coding scheme, MCS, of the first DL channel transmission corresponds to less than the maximum MCS, perform the link adaptation by at least one of increasing the MCS of the second DL channel transmission and maintaining the transmit power of the second DL channel transmission at the first transmit power value.

In some embodiments of the third aspect, the processing circuitry is further configured to perform the link adaptation by being configured to: if the HARQ indication indicates a non-acknowledgement and the first transmit power value is less than a predetermined maximum power value, perform the link adaptation by increasing the transmit power of the second DL channel transmission to greater than the first transmit power value; and if the HARQ indication indicates a non-acknowledgement and the first transmit power corresponds to the predetermined maximum power value, perform the link adaptation by at least one of decreasing a modulating and coding scheme, MCS, of the second DL channel transmission and maintaining the transmit power of the second DL channel transmission at the first transmit power value.

In some embodiments of the third aspect, the processing circuitry is further configured to receive a first uplink, UL, channel transmission at a first transmit power value; decode and determine a decoding error rate for decoding the first UL channel transmission; determine whether a modulation and coding scheme, MCS, of the first UL channel transmission corresponds to a maximum MCS; and trigger the link adaptation for the channel transmission by being configured to signal an indication to a wireless device to perform the link adaptation comprising adjusting the transmit power, the indication based at least in part on the determined decoding error rate and whether the MCS corresponds to the maximum MCS. In some embodiments of the third aspect, the processing circuitry is further configured to trigger the link adaptation by being configured to: if the MCS of the first UL channel transmission corresponds to the maximum MCS and the decoding error rate at most meets a threshold error rate, signal the indication to perform the link adaptation by reducing the transmit power of a second UL channel transmission.

In some embodiments of the third aspect, the processing circuitry is further configured to trigger the link adaptation for the channel transmission by being configured to receive an interference indication from a neighboring network node; and as a result of the received interference indication, trigger the link adaptation for the channel transmission to reduce the transmit power of the channel transmission. In some embodiments of the third aspect, the processing circuitry is further configured to implement power sharing between at least two link adaptation processes for at least two multiple-user multiple-input multiple-output, MU MIMO, wireless devices, based at least in part on a Hybrid Automatic Repeat reQuest, HARQ, indication received from at least one of the two MU MIMO wireless devices. In some embodiments of the third aspect, the processing circuitry is further configured to, based at least in part on a channel quality indicator, CQI, report, a reference signal receiving power, RSRP, measurement, and an angle of arrival, AOA, estimation, determine an initial power level for a downlink, DL, channel transmission to prevent power saturation at a wireless device.

According to a fourth aspect of the present disclosure, a wireless device is provided. The wireless device includes processing circuitry. The processing circuitry is configured to cause the wireless device to receive a downlink, DL, channel transmission at a first transmit power value; and transmit a message to a network node, the message indicating a power saturation condition as a result of the first transmit power value.

In some embodiments of the fourth aspect, the processing circuitry is further configured to as a result of transmitting the message indicating the power saturation condition, receive a second DL channel transmission having a second transmit power value, the second transmit power value being less than the first transmit power value. In some embodiments of the fourth aspect, the second DL channel transmission corresponds to a beamformed signal. In some embodiments of the fourth aspect, the processing circuitry is further configured to determine whether the received DL channel transmission at the first transmit power value exceeds a predetermined transmit power threshold value. In some embodiments of the fourth aspect, the processing circuitry is further configured to: if the first transmit power value exceeds the predetermined transmit power threshold value, determine to transmit the message; and if the first transmit power value does not exceed the predetermined transmit power threshold value, determine to not transmit the message.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
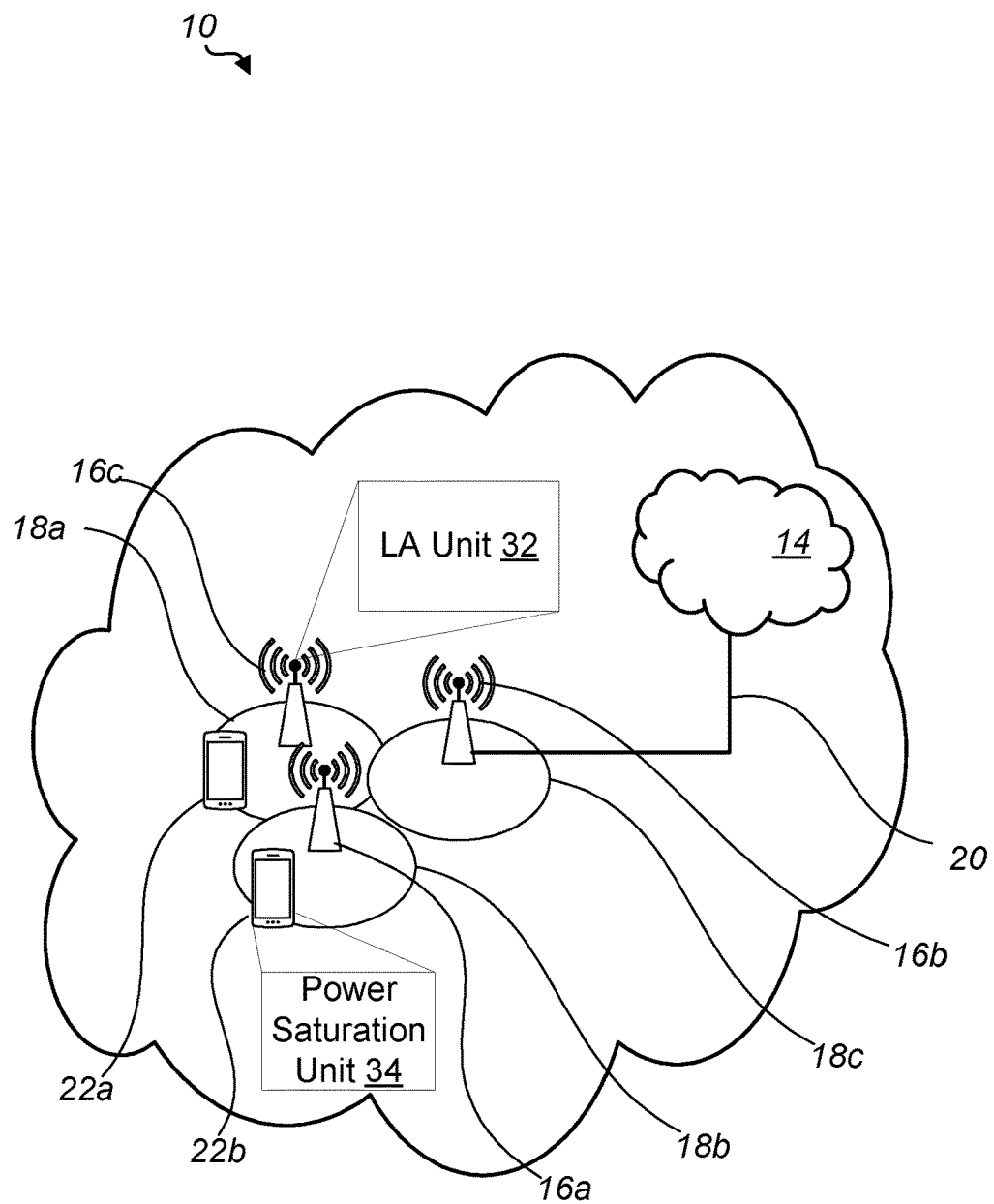
FIG. 1 is a schematic diagram of an exemplary network architecture illustrating a communication system connected via an intermediate network according to the principles in the present disclosure.

With beamforming, power is transmitted with a flashlight-like effect, where one transmission time interval (TTI) has sudden power in one direction leading to interference that will no longer be there in the next TTI. Controlling transmission power may, at least in part, mitigate this issue. Complex power allocation techniques for optimizing the beamforming weights and power are generally known. However, these known techniques usually require elaborate channel knowledge of the WD(s) and interference knowledge. Additionally, more often than not, power is not controlled in the downlink and full power is often used for beamformed transmissions, resulting in excessively generated interference.

Accordingly, some embodiments of the present disclosure provide for adapting power backoff (PB) for e.g., beamformed signals. In some embodiments, traditional link adaptation (LA) techniques may be extended to not only adapt the modulation and coding scheme (MCS) but also adapt power backoff (PB) for e.g., beamformed signals.

For example, as an LA unit (e.g., software, hardware circuitry and/or a combination thereof that is configured to perform LA) determines that a maximum MCS has been reached, the LA unit may change the mode (e.g., from MCS adaptation mode to PB mode) to start modulating the power level or applying power backoff according to the techniques described in the present disclosure. In some embodiments, the "maximum MCS" may correspond to a predetermined maximum threshold value, such as, a maximum modulation scheme value (e.g., 64 or 256 quadrature amplitude modulation (QAM) that the WD and/or network node is capable of or has otherwise been determined as a threshold value) and/or a predetermined maximum coding rate (e.g., 5/6) that the WD and/or network node is capable of or has otherwise been determined as a threshold value for a maximum data rate. In some embodiments, once the maximum MCS is reached, the network node may switch to PB mode and begin power backoff. Similarly, in some embodiments, the "maximum power" may correspond to a predetermined maximum power level that the WD and/or network node is capable of or has otherwise been determined as a threshold value.

Some advantages provided by one or more embodiments in the present disclosure may include one or more of the following:
  Reduce power for some signals/WDs which may result in one or more of:
    reducing interference;
    easing the WD's power usage; and/or
    reducing the flashlight effect where the narrow beam creates flashlight interference to WDs in neighboring cells at high power intermittently.
  Lower energy consumption/heating of antenna array;
  Enables Cell scaling;
  Independence of power control from the beamforming method;
  Adaptable to future beamforming methods;
  Simplicity: straightforward to implement, as compared to existing beamforming power allocation techniques; and/or
  Applicable to many products from legacy products to AAS.

In addition, some embodiments of the present disclosure may provide increased detectability of conditions under which PB may be beneficial, such as by re-using Hybrid Automatic Repeat reQuest (HARQ) indicator (HI) to observe received power on the Physical Downlink Shared Channel (PDSCH), e.g., WD sends an acknowledgement (ACK), receives a transmission having a maximum (max) MCS and starts receiving lower power according to the PB technique disclosed herein. This may occur independent of the reported channel quality indicator (CQI) or actual channel conditions.

Before describing in detail exemplary embodiments, it is noted that the embodiments reside primarily in combinations of apparatus components and processing steps related to link-adaptation (LA) power backoff for beamforming. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB, relay node, access point, radio access point, Remote Radio Unit (RRU) Remote Radio Head (RRH).

In some embodiments, the phrase "correctly decoded" is used to indicate whether or not a radio signal transmission was accurately/successfully received and/or interpreted by e.g., a receiver, which correct/successful decoding may be used as an explicit or implicit indication of channel conditions (e.g., between transmitter and receiver) and therefore whether or not transmit power may be adjusted according to the techniques provided in the present disclosure. Whether or not a previous channel transmission was correctly decoded/received may be performed in one or more ways. For example, in some embodiments, whether or not a previous channel transmission was correctly decoded by e.g., the receiver, may be determined by e.g., the transmitter by, for example, a HARQ ACK/NACK indication in e.g., uplink control information (UCI). In some embodiments, whether or not a previous channel transmission was correctly decoded by e.g., the receiver may be determined by e.g., the transmitter by, for example, a new data indicator and/or a HARQ process identifier (ID) in e.g., UCI. In yet other embodiments, whether or not a previous channel transmission was correctly received/decoded may be performed in other ways.

Although the description herein may be explained in the context of e.g., beamformed signals and/or PDSCH transmissions, it should be understood that the principles may also be applicable to other channels, such as, for example, PUSCH, non-beamformed signals, broadcast signals or other physical channel transmissions in which it may be beneficial to adjust transmit power levels according to the principles in this disclosure.

The term "signaling" used herein may include any of: high-layer signaling (e.g., via Radio Resource Control (RRC) or a like), lower-layer signaling (e.g., via a physical control channel or a physical shared channel), or a combination thereof. The signaling may be implicit or explicit. The signaling may also be made directly to another node or via a third node.

In some embodiments, control information on one or more resources may be considered to be transmitted in a message having a specific format. A message may comprise or represent bits representing payload information and coding bits, e.g., for error coding.

Receiving (or obtaining) control information may comprise receiving one or more control information messages (e.g., power control parameter, HARQ indication). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication (e.g., HARQ indicator, power control command, MCS, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

A channel may generally be a logical or physical channel. A channel may comprise and/or be arranged on one or more carriers, in particular a plurality of subcarriers. A wireless communication network may comprise at least one network node, in particular a network node as described herein. A terminal (e.g., WD) connected or communicating with a network may be considered to be connected or communicating with at least one network node, in particular any one of the network nodes described herein.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a physical downlink shared channel (PDSCH), a physical uplink shared channel (PUSCH), a physical downlink control channel (PDCCH), a physical uplink control channel (PUCCH), etc.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Any two or more embodiments described in this disclosure may be combined in any way with each other.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a link adaptation (LA) unit 32 which is configured to trigger a link adaptation for a channel transmission, the link adaptation comprising adjusting a transmit power of the channel transmission based at least in part on whether a previous channel transmission was correctly decoded. A wireless device 22 is configured to include a power saturation unit 34 which is configured to receive a downlink, DL, channel transmission at a first transmit power value; and transmit a message to a network node 16, the message indicating a power saturation condition as a result of the first transmit power value.

Example implementations, in accordance with an embodiment, of the WD 22 and the network node 16 discussed in the preceding paragraphs will now be described with reference to FIG. 2. In a communication system 10, a network node 16 provided in a communication system 10 and including hardware 58 enabling it to communicate with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include LA unit 32 configured to perform the processes described herein with respect to the network node 16 (e.g., processes described with reference to FIG. 3 and/or any of the other flowcharts).

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22. In providing the service to the user, the client application 92 may receive request data and provide user data in response to the request data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a power saturation unit 34 configured to perform any of the processes described herein with respect to the WD 22 (e.g., processes described with reference to FIG. 4 and/or any of the other flowcharts).

Although not shown, in some embodiments, WD 22 may also include a LA unit 32 configured to perform LA to control power backoff for uplink transmissions according to the techniques in the present disclosure.

Figure 2:
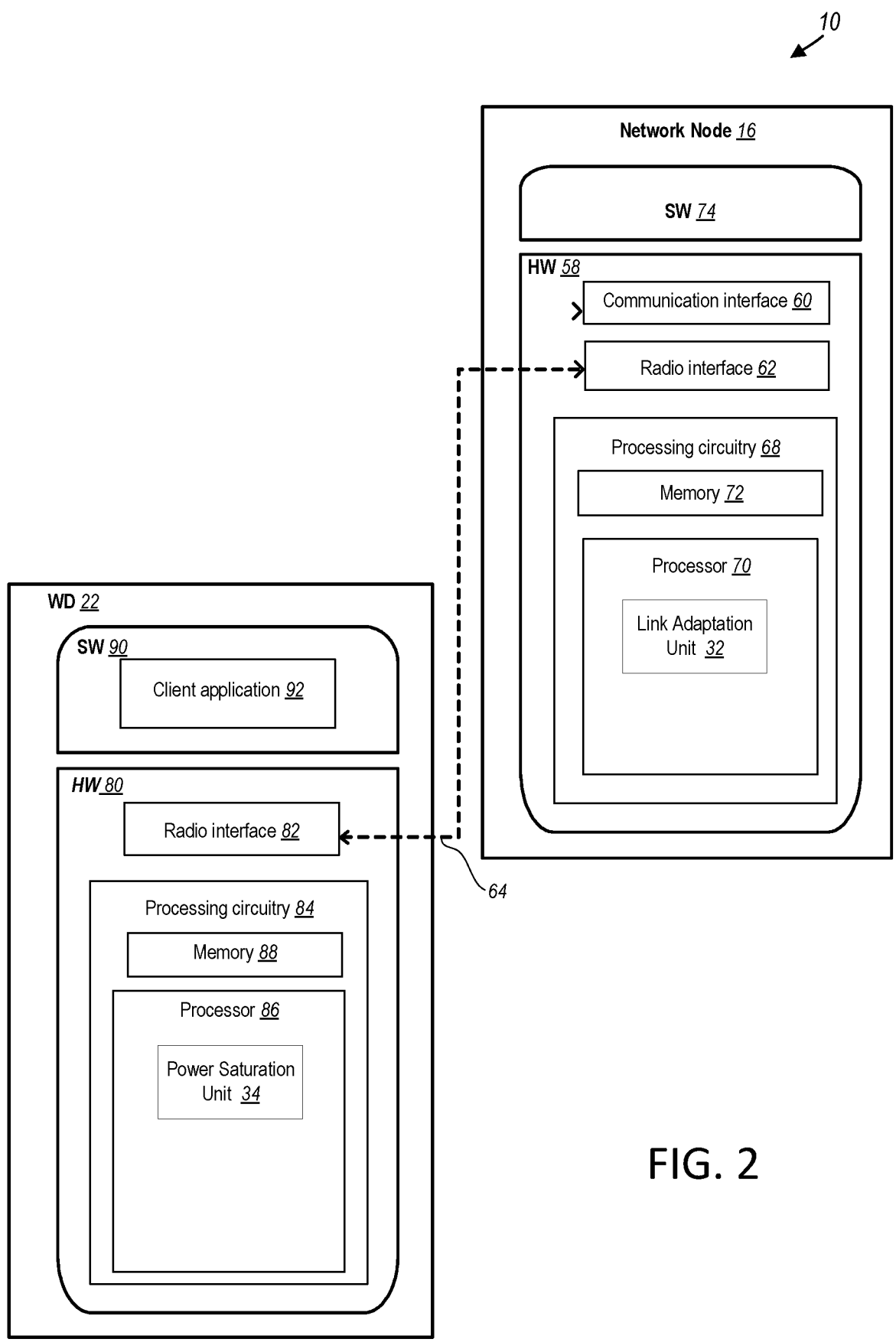
FIG. 2 is a block diagram of a network node in communication with a wireless device over an at least partially wireless connection according to some embodiments of the present disclosure.

In some embodiments, the inner workings of the network node 16 and WD 22 may be as shown in FIG. 2 and independently, the surrounding network topology may be that of FIG. 1.

In FIG. 2, the connection between the wireless device 22 and the network node 16 is shown without explicit reference to any intermediary devices and the precise routing of messages via these devices. Network infrastructure may determine the routing, which it may be configured to hide from the WD 22 or from a service provider, or both. The network infrastructure may further take decisions by which it dynamically changes the routing (e.g., on the basis of load balancing consideration or reconfiguration of the network).

Although FIGS. 1 and 2 show various "units" such as LA unit 32, and power saturation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
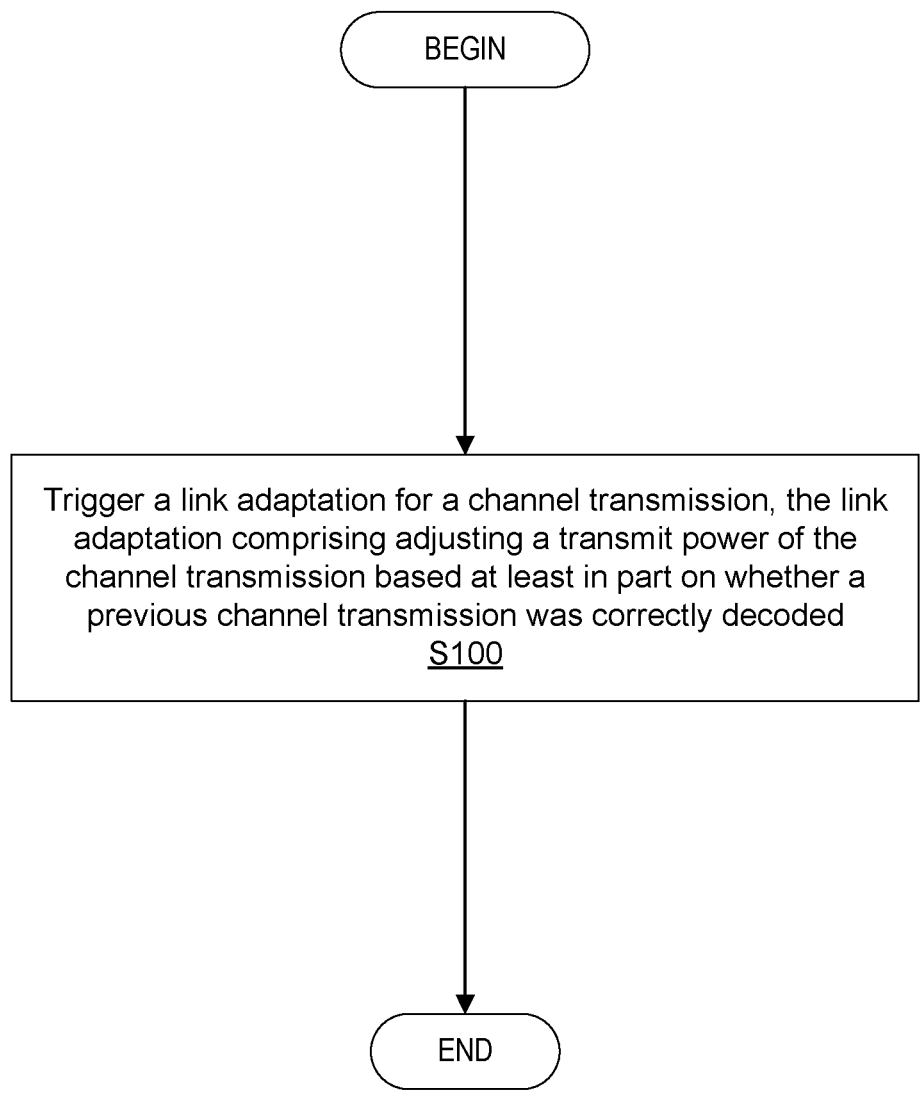
FIG. 3 is a flowchart of an exemplary process in a network node for power backoff unit according to some embodiments of the present disclosure.

FIG. 3 is a flowchart of an exemplary process in a network node 16 for link adaptation power backoff according to some embodiments of the present disclosure. One or more Blocks and/or functions and/or methods performed by the network node 16 may be performed by one or more elements of network node 16 such as by LA unit 32 in processing circuitry 68, processor 70 and/or radio interface 62, etc. according to the example method. The example method includes triggering (Block S100) (such as via LA unit 32, processing circuitry 68, processor 70 and/or radio interface 62), a link adaptation for a channel transmission, the link adaptation comprising adjusting a transmit power of the channel transmission based at least in part on whether a previous channel transmission was correctly decoded.

In some embodiments, the link adaptation further includes an outer-loop link adaption comprising the adjusting the transmit power of the channel transmission based at least in part whether the previous channel transmission was correctly decoded; and an inner-loop link adaptation comprising adjusting a modulating and coding scheme, MCS, of the channel transmission based at least in part on whether the previous channel transmission was correctly decoded. In some embodiments, the channel transmission and the previous channel transmission each correspond to a beamformed signal. In some embodiments, the method further includes transmitting (such as via LA unit 32, processing circuitry 68, processor 70 and/or radio interface 62), a first downlink, DL, channel transmission at a first transmit power value; and receiving, such as via LA unit 32, processing circuitry 68, processor 70 and/or radio interface 62, a Hybrid Automatic Repeat reQuest, HARQ, indication of reception of the first DL channel transmission. In some embodiments, the triggering the link adaptation for the channel transmission further includes performing (such as via LA unit 32, processing circuitry 68, processor 70 and/or radio interface 62), the link adaptation comprising adjusting a transmit power of a second DL channel transmission based at least in part on the received HARQ indication.

In some embodiments, the triggering the link adaptation further includes, based at least in part on the received HARQ indication, selecting one of: an outer-loop link adaption comprising the adjusting the transmit power of the second DL channel transmission based at least in part on the received HARQ indication; and an inner-loop link adaptation comprising increasing a modulating and coding scheme, MCS, of the second DL channel transmission based at least in part on the received HARQ indication. In some embodiments, the performing the link adaptation further comprises: if the HARQ indication indicates an acknowledgement and a modulating and coding scheme, MCS, of the first DL channel transmission corresponds to a maximum MCS, performing the link adaptation by adjusting the transmit power of the second DL channel transmission; and if the HARQ indication indicates an acknowledgement and a modulating and coding scheme, MCS, of the first DL channel transmission corresponds to less than the maximum MCS, performing the link adaptation by at least one of increasing the MCS of the second DL channel transmission and maintaining the transmit power of the second DL channel transmission at the first transmit power value.

In some embodiments, the performing, such as via LA unit 32, processing circuitry 68, processor 70 and/or radio interface 62, the link adaptation further comprises: if the HARQ indication indicates a non-acknowledgement and the first transmit power value is less than a predetermined maximum power value, performing the link adaptation by increasing the transmit power of the second DL channel transmission to greater than the first transmit power value; and if the HARQ indication indicates a non-acknowledgement and the first transmit power corresponds to the predetermined maximum power value, performing the link adaptation by at least one of decreasing a modulating and coding scheme, MCS, of the second DL channel transmission and maintaining the transmit power of the second DL channel transmission at the first transmit power value.

In some embodiments, the method (performed by components that may include LA unit 32, processing circuitry 68, processor 70 and/or radio interface 62) further includes receiving a first uplink, UL, channel transmission at a first transmit power value; decoding and determining a decoding error rate (e.g., block error rate (BLER)) for decoding the first UL channel transmission; and determining whether a modulation and coding scheme, MCS, of the first UL channel transmission corresponds to a maximum MCS. In some embodiments, the triggering the link adaptation for the channel transmission further comprises signaling, such as via LA unit 32, processing circuitry 68, processor 70 and/or radio interface 62, an indication to a wireless device 22 to perform the link adaptation comprising adjusting the transmit power, the indication based at least in part on the determined decoding error rate and whether the MCS corresponds to the maximum MCS.

In some embodiments, as a result of the signaled indication, the WD 22 may perform LA by adjusting the transmit power accordingly. For example, if the signaled indication indicates that the WD 22 should lower the transmit power, the WD 22 may perform LA by reducing the transmit power for a second, subsequent UL channel transmission. On the other hand, if the signaled indication indicates that the WD 22 should increase the transmit power, the WD 22 may increase the transmit power for the second, subsequent UL channel transmission. For example, if the decoding error rate is low (e.g., below a target BLER) and the MCS is at maximum MCS, the network node 16 may signal to the WD 22 that UL transmit power can be reduced for subsequent UL transmissions.

It is also noted that although the LA unit 32 is shown in FIGS. 1 and 2 as being with the network node 16, in some embodiments, the WD 22 may include an LA unit 32 configured to perform one or more of the methods described as being performed by the LA unit 32. For example, in some embodiments, the WD 22 may adjust transmit power by determining a decoding error rate and, instead of waiting for the network node 16 to signal to the WD 22 to adjust transmit power, the WD 22 may, in some embodiments, independently adjust transmit power for UL transmissions according to one of the more the techniques described herein (e.g., if the decoding error rate is low and the MCS for UL transmissions is at maximum MCS).

In some embodiments, the triggering the link adaptation further comprises: if the MCS of the first UL channel transmission corresponds to the maximum MCS and the decoding error rate at most meets a threshold error rate, signaling the indication to perform the link adaptation by reducing the transmit power of a second UL channel transmission. In some embodiments, the triggering the link adaptation for the channel transmission comprises: receiving, such as via LA unit 32, processing circuitry 68, processor 70 and/or radio interface 62, an interference indication from a neighboring network node 16; and as a result of the received interference indication, triggering, such as via LA unit 32, processing circuitry 68, processor 70 and/or radio interface 62, the link adaptation for the channel transmission to reduce the transmit power of the channel transmission.

In some embodiments, the method further includes implementing power sharing between at least two link adaptation processes for at least two multiple-user multiple-input multiple-output, MU MIMO, wireless devices 22, based at least in part on a Hybrid Automatic Repeat reQuest, HARQ, indication received from at least one of the two MU MIMO wireless devices 22.

In some embodiments, the method further includes based at least in part on a channel quality indicator, CQI, report, a reference signal receiving power, RSRP, measurement, and an angle of arrival, AOA, estimation, determining an initial power level for a downlink, DL, channel transmission to prevent power saturation at a wireless device 22.

Figure 4:
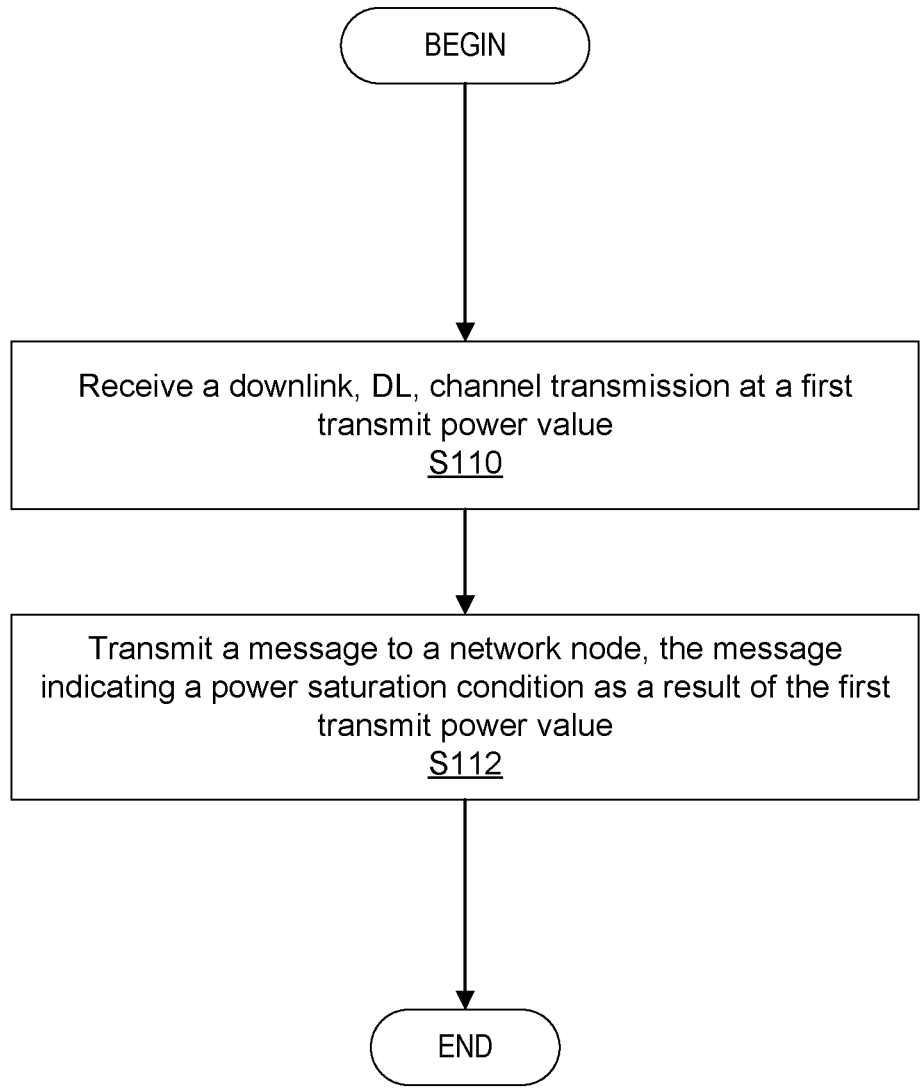
FIG. 4 is a flowchart of an exemplary process in a wireless device for power saturation unit according to some embodiments of the present disclosure.

FIG. 4 is a flowchart of an exemplary process in a wireless device 22 for power saturation notification and/or link adaptation power backoff according to some embodiments of the present disclosure. One or more Blocks and/or functions and/or methods performed by WD 22 may be performed by one or more elements of WD 22 such as by power saturation unit 34 in processing circuitry 84, processor 86, radio interface 82, etc. The example method includes receiving (Block S102), such as via power saturation unit 34, processing circuitry 84, processor 86 and/or radio interface 82, a downlink, DL, channel transmission at a first transmit power value. The method includes transmitting (Block S104), such as via power saturation unit 34, processing circuitry 84, processor 86 and/or radio interface 82, a message to a network node 16, the message indicating a power saturation condition as a result of the first transmit power value.

In some embodiments, the method further includes as a result of transmitting the message indicating the power saturation condition, receiving, such as via power saturation unit 34, processing circuitry 84, processor 86 and/or radio interface 82, a second DL channel transmission having a second transmit power value, the second transmit power value being less than the first transmit power value. In some embodiments, the second DL channel transmission corresponds to a beamformed signal. In some embodiments, the method further includes determining, such as via power saturation unit 34, processing circuitry 84, processor 86 and/or radio interface 82, whether the received DL channel transmission at the first transmit power value exceeds a predetermined transmit power threshold value. In some embodiments, the method further includes if the first transmit power value exceeds the predetermined transmit power threshold value, determining to transmit the message; and if the first transmit power value does not exceed the predetermined transmit power threshold value, determining to not transmit the message.

Having generally described arrangements for link-adaptation (LA) power backoff, arrangements, functions and processes are provided as follows, and which may be implemented by a network node 16 and/or a wireless device 22.

Some embodiments provide for link adaptation (LA) techniques that may be extended to not only adapt the modulation and coding scheme (MCS) but also adapt power backoff (PB) for, e.g., beamformed signals. For example, for nodes (e.g., WD 22 or network node 16) to which signals are beamformed (e.g., downlink channel transmissions, such as Physical Downlink Shared Channel (PDSCH) or Physical Downlink Control Channel (PDCCH), uplink channel transmission, such as, Physical Uplink Shared Channel (PUSCH) or Physical Uplink Control Channel (PUCCH)), power backoff may be applied according to one or more of the following:

as HARQ failure rate reaches lower than X threshold value and MCS is at maximum (max) MCS, power scaling may be lowered; and/or as HARQ failure rate increases above X threshold value, power scaling may be increased until maximum power is reached.

Accordingly, HARQ successes (e.g., ACK) and HARQ failures (e.g., NACK) can be used to adjust the power of beamformed signals corresponding to physical channels upward and downward as part of LA.

Figure 5:
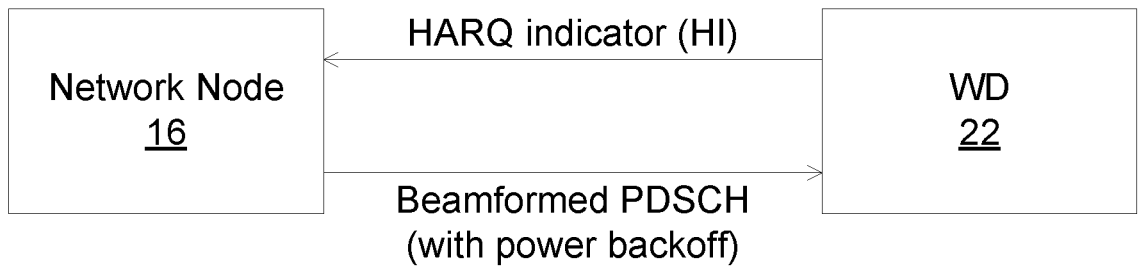
FIG. 5 is a schematic diagram of example signaling between a network node and a wireless device for adapting downlink power control according to some embodiments of the present disclosure.

FIG. 5 illustrates one example embodiment in which HARQ indicators (HI) from the WD 22 are received by the network node 16 and cause the network node 16 to adjust (e.g., increase or lower) the power of a downlink channel transmission (e.g., beamformed PDSCH). For example, the network node 16 may transmit a beamformed signal corresponding to a PDSCH at a first power level and receive an acknowledgement (ACK) HI from the WD 22 acknowledging that the PDSCH was received/correctly decoded. Responsive to the ACK HI, the network node 16 may determine whether MCS for PDSCH is at its maximum. If MCS is at its maximum, the network node 16 may apply power backoff lowering the transmit power for PDSCH transmissions. On the other, if the network node 16 receives a non-acknowledgement (NACK) HI from the WD 22 indicating the PDSCH was not received, i.e., not correctly decoded, the network node 16 may determine whether MCS for PDSCH is at the maximum value. If MCS is the maximum value, the network node 16 may apply power backoff increasing the transmit power for PDSCH transmissions. However, if MCS is not at the maximum value, the network node 16 may apply normal LA (e.g., instead of the power backoff) to increase the MCS rate.

Figure 6:
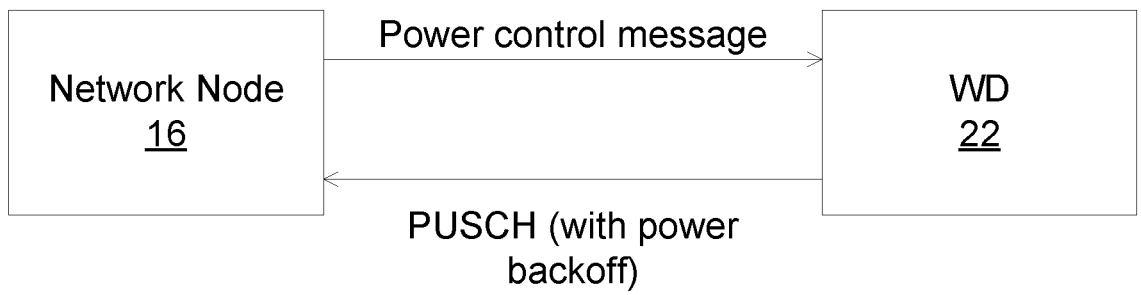
FIG. 6 is a schematic diagram of example signaling between a network node and a wireless device for adapting uplink power control according to some embodiments of the present disclosure.

A similar mechanism can be used to control uplink transmit power. FIG. 6 illustrates one example embodiment in which the WD 22 can apply power backoff for a physical uplink channel transmission (e.g., PUSCH, PUCCH, etc.). The network node 16 may transmit power control messages (increase/lower power) based on HARQ/MCS adaptation. For example, the WD 22 may transmit a PUSCH signal. The network node 16 may decode the transmission, determine the decoding error rate, and if the decoding error rate is at or above a given rate threshold value and/or MCS is at the maximum value (e.g., reached a predetermined maximum MCS), the network node 16 may send a power control message to the WD 22. The power control message may instruct the WD 22 to apply power backoff by e.g., lowering transmit power for PUSCH. On the other hand, if MCS is not at the maximum value, the network node 16 may instead instruct the WD to increase MCS for PUSCH.

Figure 7:
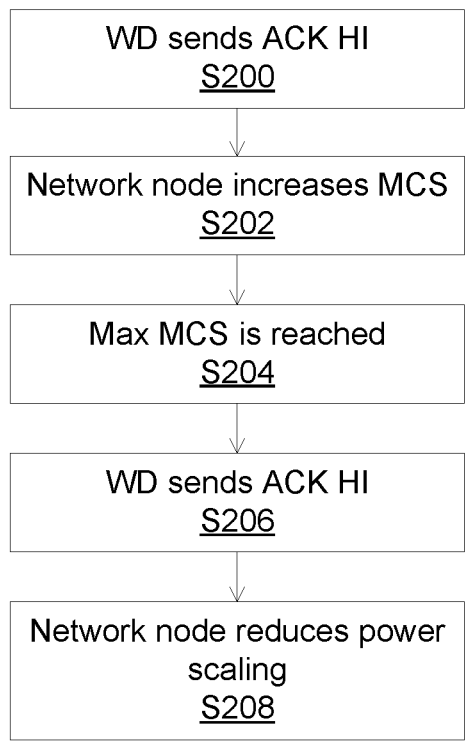
FIG. 7 is a flowchart that illustrates an example process that leads to decreasing power according to some embodiments of the present disclosure.

FIG. 7 illustrates an example process in which power backoff is applied to decrease transmit power according to the techniques provided in the present disclosure. Assuming a downlink (DL) transmission was sent by the network node 16, the WD 22 may, in step S200, send an ACK HI to the network node 16 (via e.g., PUCCH or PUSCH) acknowledging receipt of the DL transmission. In step S202, the network node 16 may increase MCS. In step S204, the network node 16 determines that maximum MCS has been reached. In step S206, the WD 22 sends another ACK HI to the network node 16 acknowledging receipt of yet another DL transmission. In step S208, because the maximum MCS has been reached and the WD 22 still appears to be correctly receiving/decoding the DL channel transmissions, the network node 16 may apply power backoff to reduce power scaling for subsequent DL channel transmissions (which may have the benefit of reducing interference caused by beamformed signals as discussed herein above). Accordingly, some embodiments of the present disclosure advantageously extend link adaptation (LA) techniques to not only adapt the modulation and coding scheme (MCS) but also adapt power backoff (PB) for signals, such as beamformed signals, based, for example, on HARQ indications.

Figure 8:
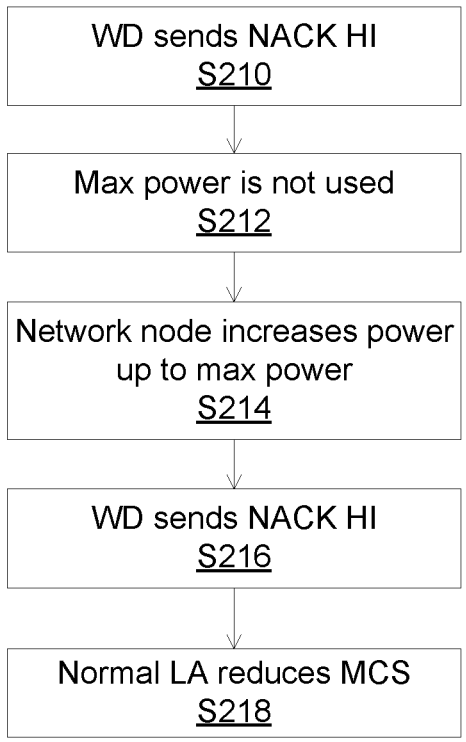
FIG. 8 is a flowchart that illustrates an example process that leads to increasing power before falling back to conventional outerloop link-adaptation (OLA) behavior according to some embodiments of the present disclosure.

FIG. 8 illustrates an example process in which transmit power is increased according to the techniques provided in the present disclosure. Assuming a downlink (DL) transmission was sent by the network node 16, the WD 22 may, in step S210, send a NACK HI to the network node 16 indicating that the DL transmission was not received/not correctly decoded. In step S212, the network node 16 may determine that maximum (max) power is not being used for the DL channel. In step S214, as a result of the NACK HI, the network node 16 may increase the power up to the maximum power level (e.g., which may be a predetermined maximum power value) and transmit a signal corresponding to the DL channel at such maximum power level. In step S216, the WD 22 may send yet another NACK HI. In step S218, since maximum power is being used and the network node 16 is still receiving NACKs from the WD 22, the network node 16 may use LA to adjust MCS downward e.g., until the WD 22 is able to correctly receive and decode a DL channel transmission. Although FIGS. 7 and 8 have a different result (decreasing power versus increasing power), it should be understood that the same power backoff technique for LA may be used in these examples; yet the results may differ based at least in part on whether the network node 16 receives a NACK or an ACK, as well as, on whether max MCS and/or maximum power are reached for the channel transmissions.

In some embodiments, additional inputs may be considered to influence whether MCS or power are adjusted for LA of the channel transmissions. In other words, an optimal balance between increasing/lowering power as opposed to MCS can be influenced by one or more additional parameters, including exterior input from e.g., a neighboring cell. For example, as shown in FIG. 9, exterior input from a neighboring network node 16b may influence application of power backoff, even if, for example, MCS has not maxed out, in order to reduce interference to neighboring cell(s).

Figure 9:
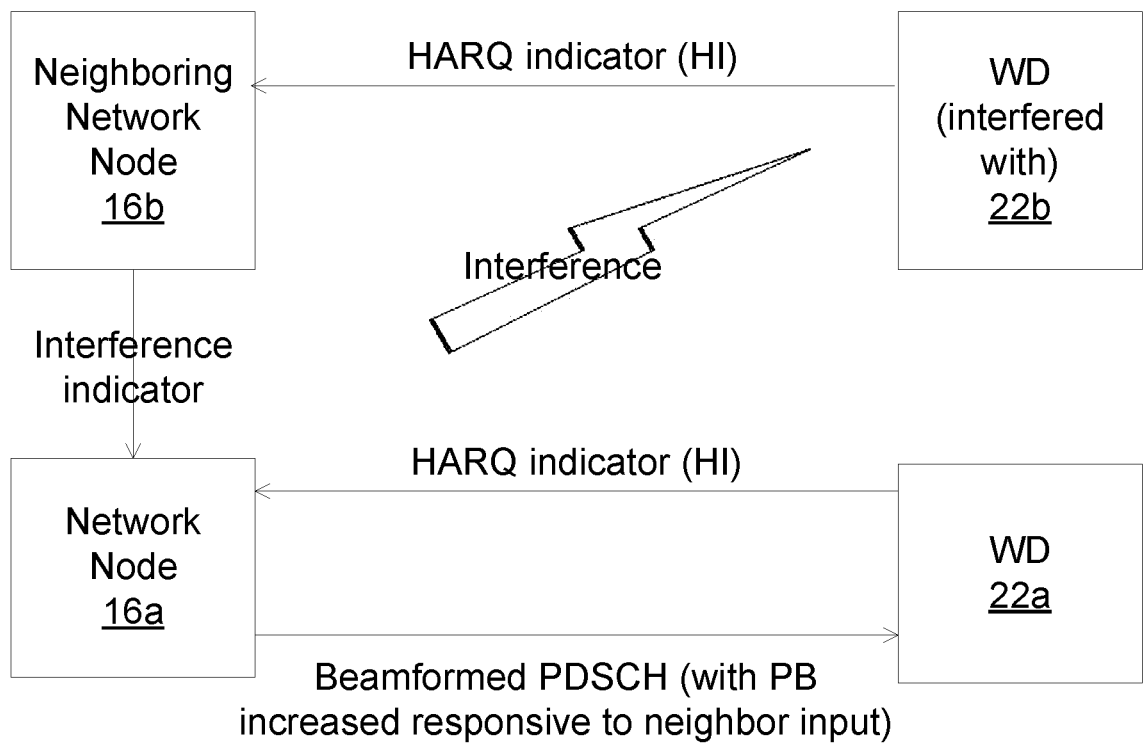
FIG. 9 illustrates an example of exterior input for adapting a power backoff (PB) amount according to some embodiments of the present disclosure.

FIG. 9 illustrates HIs being sent from WD 22a to network node 16a and from WD 22b to a neighboring network node 16b in a neighboring cell. Interference is affecting WD 22b and therefore WD 22b may be sending NACK HI to network node 16b. Accordingly, neighboring network node 16b may send an interference indicator to network node 16a via e.g., sidelink channel. The interference indicator may provide interference information to the network node 16a and/or may request power backoff from the network node 16a. As a result of the interference indicator from the neighboring cell, the network node 16 may apply power backoff to the beamformed PDSCH transmission to the WD 22a, even if maximum MCS has not been reached for the PDSCH. In some embodiments, the rate at which power backoff is applied may be increased/decreased based this input from neighboring cells, or the levels of MCS may be increased/decreased before power backoff is applied. The input from neighboring cell(s) (e.g., interference indicator message) may also be used as a factor for increasing power if, for example, the interference indicator indicates low interference levels.

Figure 10:
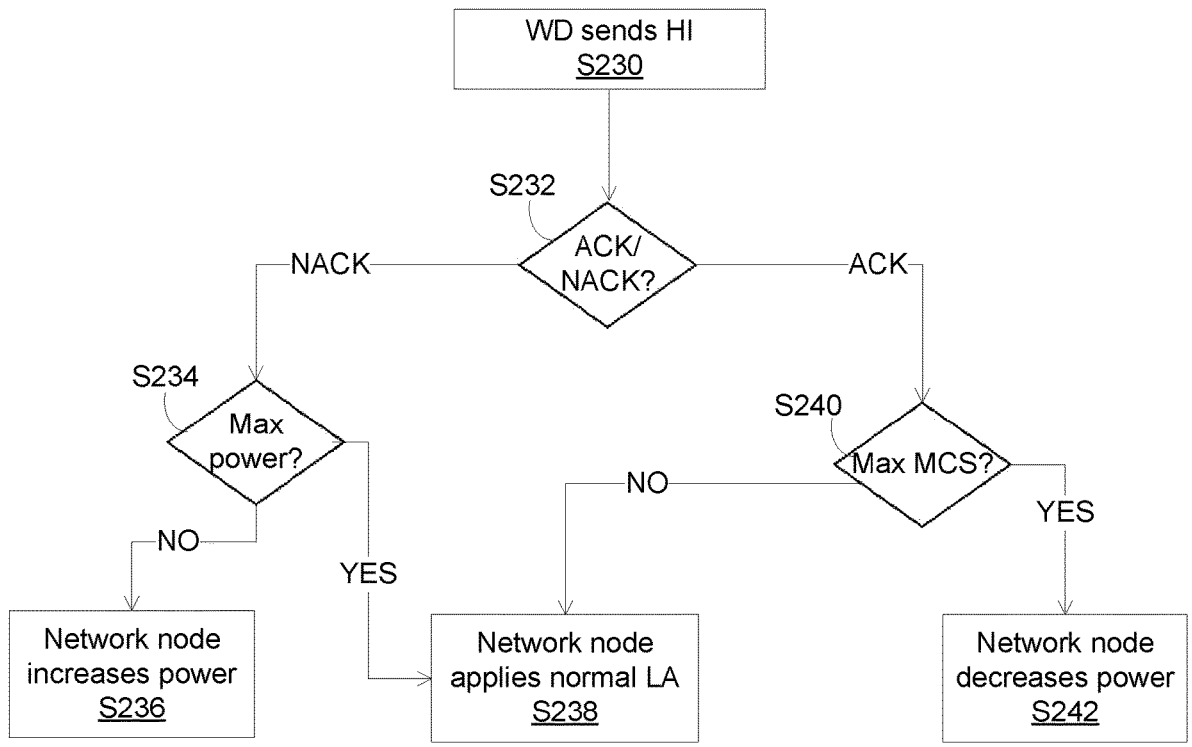
FIG. 10 is a flowchart of an example decision process for applying conventional OLA or PB in link adaptation (LA) according to some embodiments of the present disclosure.

FIG. 10 is a flowchart illustrating another example process for extending link adaptation (LA) techniques to not only adapt the modulation and coding scheme (MCS) but also adapt power backoff (PB) based at least in part on HI. In step S230, the WD 22 sends HI to the network node 16. In step S232, the network node 16 determines whether the HI indicates an ACK or a NACK. If the HI indicates NACK (e.g., DL was not received/not correctly decoded), in step S234, the network node 16 may determine whether maximum power was used for the DL transmission. If the answer is no and maximum power was not used for the DL transmission, the process proceeds to step S236, where the network node 16 increases power and transmits a DL transmission at the increased power level. If the answer is yes and maximum power was used for the DL transmission, the process proceeds to step S238, where the network node 16 applies normal LA (e.g., adjusting MCS, which in this case may include adjusting MCS downward away from maximum MCS).

On the other hand, if the HI indicates an ACK (e.g., DL was received/corrected decoded), the process proceeds to step S240, whether the network node 16 determines whether the MCS maximum is reached for DL transmissions. If the answer is no and maximum MCS has not yet been reached, the network node 16 proceeds to step S238, where the network node 16 applies normal LA (e.g., adjusting MCS, which in this case may include adjusting MCS upward towards maximum MCS). If the answer is yes and maximum MCS has been reached, the process may proceed to steps S242, where the network node 16 decreases power and transmits a DL transmission at the decreased power level. Accordingly, using the techniques disclosed herein, LA can be extended to include power backoff, in addition to MCS adjustment based on HARQ feedback.

Figure 11:
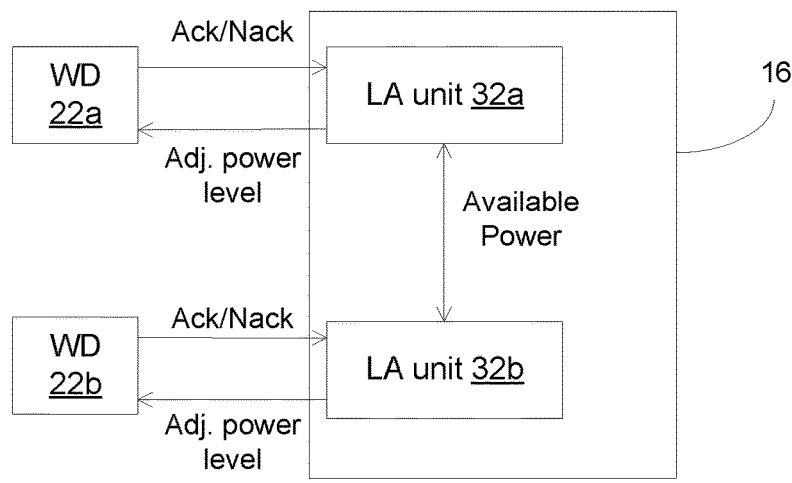
FIG. 11 is a schematic diagram illustrating an example of dynamic sharing of power across multiple-user (MU) wireless devices (WDs) according to some embodiments of the present disclosure.

Some embodiments may include dynamic sharing of power across multi-user (MU) WDs 22 in a multi-user multiple-input multiple-output (MU-MIMO) environment as illustrated in FIG. 11, for example. As multiple-user WDs 22 are scheduled together in MU-MIMO by e.g., network node 16, the power back off applied to beams for one or more MU WDs 22 reaching maximum MCS may allow for redistribution of power to beams for one or more other MU WDs 22. For example, a first user's LA unit 32a (which may perform an LA process) may reduce transmit power associated with WD 22a (using e.g., PB applied according to the techniques disclosed herein). Power normalization may then be applied across MU MIMO users (e.g., more power may be available for WD 22b and its corresponding LA unit) such that maximum emission power per branch and maximum total power are respected for the sum of all MU MIMO users. Power sharing algorithms are known and therefore will not be discussed in greater detail herein. Applying power backoff to reduce power to one or more of the MU WDs 22, such as by using the techniques disclosed herein, may result in comparatively more power becoming available for beamforming to the other MU WDs 22. In turn, this could help such other MU WDs 22 reach maximum MCS, eventually, until, for example, yet another one of the LA units 32 for a MU WD 22 starts PB mode. If all MU WDs 22 use power backoff mode (e.g., steps S242 and S236 in FIG. 10), the power normalization may normalize at a smaller value than the maximum power, which could reduce interference.

As shown in FIG. 11, in some embodiments, each MU-MIMO WD (e.g., WD 22a and 22b) may be associated with a corresponding LA unit 32a and 32b, respectively (which may perform an LA process associated with the corresponding WD). The LA unit 32 may be software, hardware or a combination thereof configured to perform link adaptation (LA) for e.g., DL beamformed transmissions for a corresponding WD 22 using MCS adjustment mode and/or power backoff adjustment mode based on HARQ ACK/NACK according to the techniques disclosed herein. Each LA unit 32 for MU MIMO WDs 22 may dynamically share available power (e.g., total power available for all MU MIMO WDs) according to e.g., a power sharing algorithm such that power reduction applied by one LA unit 32 (e.g., LA unit 32a) may benefit other LA units 32 (e.g., LA unit 32b) since more power may become available to share amongst MU MIMO users. Thus, the techniques provided in the present disclosure may be beneficial for MU MIMO.

Figure 12:
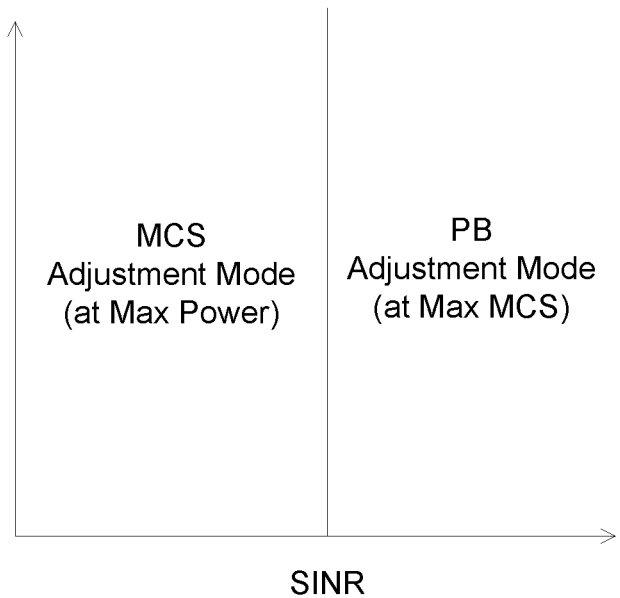
FIG. 12 illustrates an example dual-mode implementation for power backoff adjustment mode and modulation and coding scheme (MCS) adjustment mode according to some embodiments of the present disclosure.

FIG. 12 illustrates another example dual-mode implementation for power backoff (PB) adjustment mode (e.g., steps S242 and S236 in FIG. 10) and modulation and coding scheme (MCS) adjustment mode (e.g., step S238 in FIG. 10) according to some embodiments of the present disclosure. The power backoff (PB) adjustment mode and/or the MCS adjustment mode may be implemented by LA unit 32. In some embodiments, signal-to-noise-plus-interference (SINR) may be used as a factor for switching between and/or implementing MCS adjustment mode and PB adjustment mode. For example, if SINR meets or exceeds a predetermined SINR threshold value and if MCS is at its maximum value, the LA process (e.g., via LA unit 32) may switch from MCS adjustment mode to PB adjustment mode to begin reducing transmit power. If SINR falls below the predetermined SINR threshold value and if MCS is at its maximum value, the LA process (e.g., via LA unit 32) may switch from PB adjustment mode to MCS adjustment mode to begin reducing MCS. In some embodiments, other parameters may also be considered in addition to, or instead of SINR for switching between and/or implementing the two LA modes (e.g., BLER, neighboring cell input, estimated Rank, Rank report, channel quality indicator (CQI), etc.).

Figure 13:
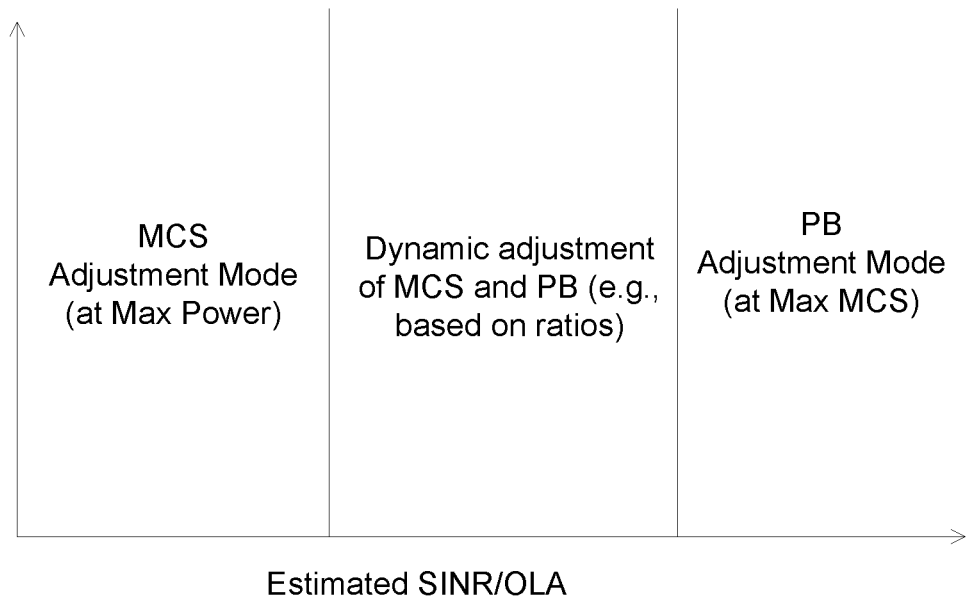
FIG. 13 illustrates an example dynamic implementation for power backoff adjustment mode and modulation and coding scheme (MCS) adjustment mode according to some embodiments of the present disclosure.
Figure 14:
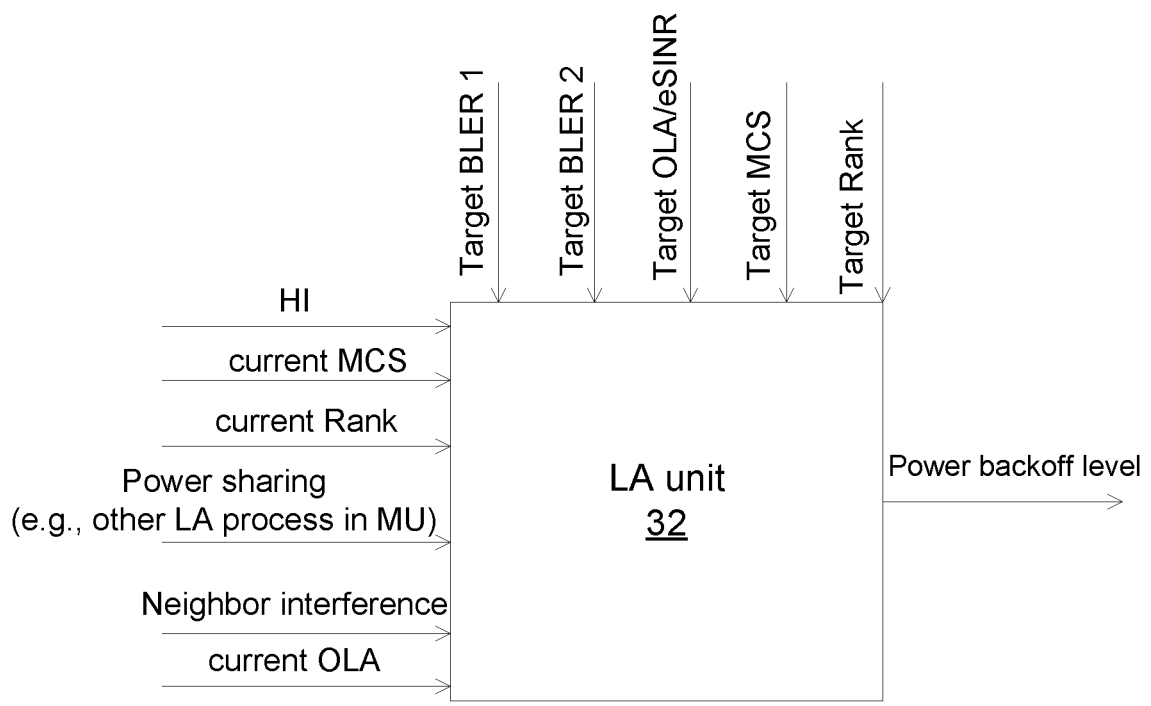
FIG. 14 is a schematic diagram illustrating an example of inputs settings and outputs according to some embodiments of the present disclosure.

FIG. 13 illustrates an example dynamic implementation for power backoff (PB) adjustment mode and modulation and coding scheme (MCS) adjustment mode according to some embodiments of the present disclosure. In some embodiments, estimated SINR or OLA may be used as a factor for switching between and/or implementing MCS adjustment mode and PB adjustment mode. For example, as shown in FIG. 13, there may be a range of estimated SINR within which there is a dynamic adjustment of MCS and power backoff based on certain parameters, for example, on ratios of parameters (e.g., BLER, neighboring cell input, estimated Rank, Rank report, channel quality indicator (CQI), etc.). FIG. 14 illustrates the various inputs that may be considered by a power scaling algorithm (which may be implemented in, e.g., LA unit 32). Non-limiting examples of the various inputs may include HI, current MCS, current Rank, power sharing, neighbor cell interference, current OLA, target block error rate (BLER) 1, target BLER 2, target estimated SINR (eSINR), target MCS, target Rank, etc. In some embodiments, the power backoff level may be a function of one or more of such inputs/parameters. In some embodiments, one or more status values can be considered to decide the power backoff level output as follows:

Current OLA value, CQI reports, Rank reports, estimated Rank, HARQ indicator, average BLER, etc.

Some history of such values may be stored and used, e.g. a moving average of inputs.

The delta output power and ratio of power increase/decrease can be set to affect a speed of convergence or convergence target.

For example, some embodiments for the power scaling algorithm may include one or more of the following:

1. Power is adjusted for a target OLA/eSINR value, such as, if the OLA is very high (difference from WD 22 reported SINR and estimated SNR), then power can be increased more rapidly than if e.g., the OLA is very low;
2. Power is adjusted for a target BLER value when MCS is maxed out (target BLER can be lower than OLA BLER target); and/or
3. Power is adjusted according to target values adjusted based on other input, such as, neighboring cell interference (e.g., can allow non-AAS neighboring cell to request to lower cell interference where the neighbor cell cannot reach a WD 22 due to constant interference).

In some embodiments, target values for influencing the network node's 16 dynamics can be provided as inputs to an operator. Example inputs and/or settings may include or be based on:

Target BLER for OLA;
Target BLER for power backoff;
Target Rank (e.g., if WD 22 is rank n capable then start power backoff only before WD 22 reaches this rank n, where n may be 1, 2, 3, 4, etc.); and/or
Target OLA before PB.

In some embodiments, different ranges for PB and MCS may be allowed, such as, for example:

between X and Y value for SINR or eSINR apply MCS adjustment, but not PB adjustment;
between MCS X and Y value, apply PB adjustment of up to −5 decibel (dB) (e.g., in relative proportion, MCS may be increased as well as power being decreased at a predetermined rate);
the PB rate can be a function of one or more of the inputs, such as, for example, current MCS, current CQI, eSINR, etc.;
for maximum MCS, the PB may be adjusted up to a maximum of −20 dB (e.g., if MCS has reached the maximum MCS threshold value, the power may be decreased up to a given threshold value at a given rate).

In some embodiments, there is a dynamic range of signals received by the WD 22 (e.g., cell specific reference signal (CRS) and PDSCH) that can influence the WD's 22 capability to work optimally and therefore a maximum PB can be set for the CRS signal for example instead of for a maximum PB for PDSCH.

In some embodiments, a conservative start-up mode may be provided in order to compensate for use of PB in the link adaptation process. For example, in conservative start-up transmit power may initially be set to low in order to prevent saturation at the WD 22 receiver, which is undesirable since saturation at the receiver may result in a low CQI report, even if channel conditions are good. In this embodiment, the network node 16 may use a first CQI report, Reference Signal Received Power (RSRP) report, Angle of Arrival (AoA) estimation, etc. to evaluate an initial power level in order to prevent saturation at the WD 22 receiver. In some embodiments, the WD 22, such as via power saturation unit 34, may be configured to determine whether a power saturation condition has occurred and, as a result, if power saturation has occurred, report receiving too much power to the network node 16. The network node 16 may respond to the report by triggering the PB algorithm to reduce power.

Accordingly, some embodiments of the present disclosure provide for extending traditional link adaptation (LA) techniques to adapt power backoff (PB) based on one or more parameters/inputs.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| AAS | Advanced antenna systems (massive MIMO) |
| BLER | block error rate |
| HARQ | Hybrid Automatic Repeat reQuest |
| HI | HARQ indicator (ACK/NACK) |
| MIMO | multiple-input multiple-output |
| MCS | Modulation and coding scheme |
| LA | link adaptation |
| OLA | outerloop link-adaptation |
| MU-MIMO | multi-user MIMO |
| PB | power backoff |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node, the method comprising:
   triggering a link adaptation for a channel transmission, the link adaptation comprising adjusting a transmit power of the channel transmission based at least in part on whether a previous channel transmission was correctly decoded;
   transmitting a first downlink (DL) channel transmission at a first transmit power value;
   receiving a Hybrid Automatic Repeat reQuest (HARQ) indication of reception of the first DL channel transmission; and
   the triggering the link adaptation for the channel transmission further comprising performing the link adaptation, performing the link adaptation comprising:
   adjusting a transmit power of a second DL channel transmission based at least in part on the received HARQ indication;
   in the case that the HARQ indication indicates an acknowledgement and a modulating and coding scheme (MCS) of the first DL channel transmission corresponds to a maximum MCS, performing the link adaptation by adjusting the transmit power of the second DL channel transmission; and
   in the case that the HARQ indication indicates an acknowledgement and a modulating and coding scheme (MCS) of the first DL channel transmission corresponds to less than the maximum MCS, performing the link adaptation by at least one of increasing the MCS of the second DL channel transmission and maintaining the transmit power of the second DL channel transmission at the first transmit power value.

2. The method of claim 1, wherein the link adaptation further comprises:
   an outer-loop link adaption comprising the adjusting the transmit power of the channel transmission based at least in part whether the previous channel transmission was correctly decoded; and
   an inner-loop link adaptation comprising adjusting a modulating and coding scheme, MCS, of the channel transmission based at least in part on whether the previous channel transmission was correctly decoded.

3. The method of claim 1, wherein the channel transmission and the previous channel transmission each correspond to a beamformed signal.

4. The method of claim 1, wherein the triggering the link adaptation further comprises:
   based at least in part on the received HARQ indication, selecting one of:
   an outer-loop link adaption comprising the adjusting the transmit power of the second DL channel transmission based at least in part on the received HARQ indication; and
   an inner-loop link adaptation comprising increasing a modulating and coding scheme (MCS) of the second DL channel transmission based at least in part on the received HARQ indication.

5. The method of claim 1, wherein the performing the link adaptation further comprises:
   in the case that the HARQ indication indicates a non-acknowledgement and the first transmit power value is less than a predetermined maximum power value, performing the link adaptation by increasing the transmit power of the second DL channel transmission to greater than the first transmit power value; and
   in the case that the HARQ indication indicates a non-acknowledgement and the first transmit power corresponds to the predetermined maximum power value, performing the link adaptation by at least one of decreasing a modulating and coding scheme (MCS) of the second DL channel transmission and maintaining the transmit power of the second DL channel transmission at the first transmit power value.

6. The method of claim 1, further comprising:
   receiving a first uplink (UL) channel transmission at a first transmit power value;
   decoding and determining a decoding error rate for decoding the first UL channel transmission; and
   determining whether a modulation and coding scheme (MCS) of the first UL channel transmission corresponds to a maximum MCS; and wherein the triggering the link adaptation for the channel transmission further comprises:
   signaling an indication to a wireless device to perform the link adaptation comprising adjusting the transmit power, the indication based at least in part on the determined decoding error rate and whether the MCS corresponds to the maximum MCS.

7. The method of claim 6, wherein the triggering the link adaptation further comprises:
   in the case that the MCS of the first UL channel transmission corresponds to the maximum MCS and the decoding error rate at most meets a threshold error rate, signaling the indication to perform the link adaptation by reducing the transmit power of a second UL channel transmission.

8. The method of claim 1, wherein the triggering the link adaptation for the channel transmission comprises:
   receiving an interference indication from a neighboring network node; and
   as a result of the received interference indication, triggering the link adaptation for the channel transmission to reduce the transmit power of the channel transmission.

9. The method of claim 1, further comprising:
   implementing power sharing between at least two link adaptation processes for at least two multiple-user multiple-input multiple-output (MU MIMO) wireless devices, based at least in part on a Hybrid Automatic Repeat reQuest (HARQ) indication received from at least one of the two MU MIMO wireless devices.

10. The method of claim 1, further comprising:
   based at least in part on a channel quality indicator (CQI) report, a reference signal receiving power, RSRP, measurement, and an angle of arrival (AOA) estimation, determining an initial power level for a downlink (DL) channel transmission to prevent power saturation at a wireless device.

11. A network node comprising processing circuitry, the processing circuitry configured to cause the network node to:
   trigger a link adaptation for a channel transmission, the link adaptation comprising adjusting a transmit power of the channel transmission based at least in part on whether a previous channel transmission was correctly decoded;
   transmit a first downlink (DL) channel transmission at a first transmit power value;
   receive a Hybrid Automatic Repeat reQuest (HARQ) indication of reception of the first DL channel transmission; and
   the triggering the link adaptation for the channel transmission further comprising performing the link adaptation, performing the link adaptation comprising:
      adjusting a transmit power of a second DL channel transmission based at least in part on the received HARQ indication;
      in the case that the HARQ indication indicates an acknowledgement and a modulating and coding scheme (MCS) of the first DL channel transmission corresponds to a maximum MCS, performing the link adaptation by adjusting the transmit power of the second DL channel transmission; and
      in the case that the HARQ indication indicates an acknowledgement and a modulating and coding scheme (MCS) of the first DL channel transmission corresponds to less than the maximum MCS, performing the link adaptation by at least one of increasing the MCS of the second DL channel transmission and maintaining the transmit power of the second DL channel transmission at the first transmit power value.

12. The network node of claim 11, wherein the link adaptation further comprises:
   an outer-loop link adaption comprising the adjusting the transmit power of the channel transmission based at least in part whether the previous channel transmission was correctly decoded; and
   an inner-loop link adaptation comprising adjusting a modulating and coding scheme, MCS, of the channel transmission based at least in part on whether the previous channel transmission was correctly decoded.

13. The network node of claim 11, wherein the channel transmission and the previous channel transmission each correspond to a beamformed signal.

14. The network node of claim 11, wherein processing circuitry is further configured to trigger the link adaptation by being configured to cause the network node to:
   based at least in part on the received HARQ indication, select one of:
      an outer-loop link adaption comprising the adjusting the transmit power of the second DL channel transmission based at least in part on the received HARQ indication; and
      an inner-loop link adaptation comprising increasing a modulating and coding scheme (MCS) of the second DL channel transmission based at least in part on the received HARQ indication.

15. The network node of claim 11, wherein the processing circuitry is further configured to perform the link adaptation by being configured to cause the network node to:
   in the case that the HARQ indication indicates a non-acknowledgement and the first transmit power value is less than a predetermined maximum power value, perform the link adaptation by increasing the transmit power of the second DL channel transmission to greater than the first transmit power value; and
   in the case that the HARQ indication indicates a non-acknowledgement and the first transmit power corresponds to the predetermined maximum power value, perform the link adaptation by at least one of decreasing a modulating and coding scheme (MCS) of the second DL channel transmission and maintaining the transmit power of the second DL channel transmission at the first transmit power value.

16. The network node of claim 11, wherein the processing circuitry is further configured to cause the network node to:
   receive a first uplink (UL) channel transmission at a first transmit power value;
   decode and determine a decoding error rate for decoding the first UL channel transmission;
   determine whether a modulation and coding scheme (MCS) of the first UL channel transmission corresponds to a maximum MCS; and
   trigger the link adaptation for the channel transmission by being configured to:
      signal an indication to a wireless device to perform the link adaptation comprising adjusting the transmit power, the indication based at least in part on the determined decoding error rate and whether the MCS corresponds to the maximum MCS.

17. The network node of claim 16, wherein the processing circuitry is further configured to trigger the link adaptation by being configured to cause the network node to:
   in the case that the MCS of the first UL channel transmission corresponds to the maximum MCS and the decoding error rate at most meets a threshold error rate, signal the indication to perform the link adaptation by reducing the transmit power of a second UL channel transmission.

18. The network node of claim 11, wherein the processing circuitry is further configured to trigger the link adaptation for the channel transmission by being configured to cause the network node to:
   receive an interference indication from a neighboring network node; and
   as a result of the received interference indication, trigger the link adaptation for the channel transmission to reduce the transmit power of the channel transmission.

19. The network node of claim 11, wherein the processing circuitry is further configured to cause the network node to:
   implement power sharing between at least two link adaptation processes for at least two multiple-user multiple-input multiple-output (MU MIMO) wireless devices, based at least in part on a Hybrid Automatic Repeat reQuest (HARQ) indication received from at least one of the two MU MIMO wireless devices.

20. The network node of claim 11, wherein the processing circuitry is further configured to cause the network node to:
   based at least in part on a channel quality indicator (CQI) report, a reference signal receiving power (RSRP) measurement, and an angle of arrival (AOA) estimation, determine an initial power level for a downlink (DL) channel transmission to prevent power saturation at a wireless device.

* * * * *